(12) United States Patent
Morise et al.

(10) Patent No.: US 7,073,647 B2
(45) Date of Patent: Jul. 11, 2006

(54) HYDRAULIC PRESSURE CONTROL APPARATUS FOR VEHICULAR HYDRAULIC POWER TRANSMISSION DEVICE WITH LOCK-UP CLUTCH

(75) Inventors: Masaru Morise, Nukata-gun (JP); Akio Sugawara, Toyota (JP); Hiroaki Takeuchi, Toyota (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 125 days.

(21) Appl. No.: 10/835,017

(22) Filed: Apr. 30, 2004

(65) Prior Publication Data

US 2004/0226795 A1 Nov. 18, 2004

(30) Foreign Application Priority Data

May 16, 2003 (JP) .............................. 2003-139552

(51) Int. Cl.
*F16H 61/14* (2006.01)
(52) U.S. Cl. .................................... 192/3.29
(58) Field of Classification Search ................ 192/3.29
See application file for complete search history.

(56) References Cited

U.S. PATENT DOCUMENTS

| | | | | |
|---|---|---|---|---|
| 4,828,084 A | * | 5/1989 | Hasegawa et al. | ............ 192/3.3 |
| 5,605,210 A | * | 2/1997 | Koike et al. | ................ 192/3.29 |
| 5,799,260 A | * | 8/1998 | Droste et al. | ................. 701/51 |
| 5,802,490 A | * | 9/1998 | Droste | ......................... 701/51 |
| 6,419,059 B1 | | 7/2002 | Nobu et al. | |
| 6,474,456 B1 | * | 11/2002 | Suzuki et al. | .............. 192/3.29 |
| 6,662,918 B1 | * | 12/2003 | Takeuchi et al. | ........... 192/3.29 |

FOREIGN PATENT DOCUMENTS

| | | |
|---|---|---|
| JP | 4-4354 | 1/1992 |
| JP | 5-187541 | 7/1993 |
| JP | 7-180768 | 7/1995 |
| JP | 8-4891 | 1/1996 |
| JP | 8-14381 | 1/1996 |
| JP | 10-89462 | 4/1998 |

\* cited by examiner

*Primary Examiner*—Saul Rodriguez
(74) *Attorney, Agent, or Firm*—Oblon, Spivak, McClelland, Maier & Neustadt, P.C.

(57) ABSTRACT

There is provided a hydraulic pressure control apparatus for a vehicular hydraulic power transmission device with a lock-up clutch, in which an increase in the temperature of hydraulic oil in an engagement side oil chamber is suppressed, durability of frictional material is improved, and the lock-up clutch is appropriately controlled.

A switching control valve (a lock-up relay valve 250 and a lock-up control valve 252) switches between connection and disconnection between each of two oil passages that communicate with an engagement side oil chamber 31, and each of a high pressure oil passage and a low pressure oil passage, according to the operating state of the lock-up clutch 11. For example, when the lock-up clutch is completely engaged, the hydraulic oil is supplied to both the two oil passages from the high pressure oil passage, hydraulic pressure PON in the engagement side oil chamber 31 is increased, and a sufficient transmission torque capacity of the lock-up clutch 11 is obtained. When the lock-up clutch 11 is in the slip state, one of the two oil passages is connected to the high pressure oil passage, and the other oil passage is connected to the low pressure oil passage such that the hydraulic oil is circulated in the engagement side oil chamber 31. Therefore, an increase in the temperature of the hydraulic oil is suppressed, the lock-up clutch 11 is cooled, and the durability of the frictional material 36 is improved.

19 Claims, 9 Drawing Sheets

HYDRAULIC PRESSURE CONTROL APPARATUS FOR VEHICULAR HYDRAULIC POWER TRANSMISSION DEVICE WITH LOCK-UP CLUTCH

INCORPORATION BY REFERENCE

The disclosure of Japanese Patent Application No. 2003-139552 filed on May 16, 2003 including the specification, drawings and abstract is incorporated herein by reference in its entirety.

BACKGROUND OF THE INVENTION

1. Field of the Invention

The invention relates to a hydraulic pressure control apparatus for a vehicular hydraulic power transmission device which includes a lock-up clutch whose operating state can be changed using a hydraulic pressure difference between an engagement side oil chamber and a disengagement side oil chamber.

2. Description of the Related Art

A vehicle is known, which includes a lock-up clutch that can mechanically connect an input side and an output side of a hydraulic power transmission device such as a torque converter and a fluid coupling such that torque can be directly transmitted. The lock-up clutch is disposed between a front cover that is an input side rotational member of the hydraulic power transmission device, and a turbine or a pump that is an output side rotational member thereof. The lock-up clutch divides a space between the front cover and the turbine or the pump into a disengagement side oil chamber on the front cover side and an engagement side oil chamber on the turbine or the pump side. Thus, a contact state between the lock-up clutch and the front cover, that is, an operating state of the lock-up clutch is controlled so as to be changed according to a hydraulic pressure difference between the engagement side oil chamber and the disengagement side oil chamber, which is obtained by subtracting the hydraulic pressure in the disengagement side oil chamber from the hydraulic pressure in the engagement side oil chamber (i.e., the hydraulic pressure in the engagement side oil chamber—the hydraulic pressure in the disengagement side oil chamber). When hydraulic oil in the disengagement side oil chamber is drained through a first oil passage which communicates with the disengagement side oil chamber, and hydraulic oil is supplied to the engagement side oil chamber through a second oil passage which communicates with the engagement side oil chamber, the hydraulic pressure in the engagement side oil chamber becomes higher than that in the disengagement side oil chamber, that is, the hydraulic pressure difference becomes positive. At this time, the lock-up clutch is engaged with the front cover through frictional material. In other words, the lock-up clutch is engaged with increasingly larger engagement force, and the lock-up clutch is completely engaged. When the hydraulic oil is supplied also to the disengagement side oil chamber, and accordingly the hydraulic pressure difference is decreased, the lock-up clutch is semi-engaged, that is, the lock-up clutch is placed in a slip state.

When the lock-up clutch is frequently placed in the slip state, frictional heat that is generated due to the slip increases. The durability of the frictional material may deteriorate due to heat deterioration caused by the frictional heat. Accordingly, a technology is proposed, in which a third oil passage that communicates with the engagement side oil chamber is provided, the hydraulic oil is circulated from the second oil passage to the third oil passage, and the lock-up clutch is cooled due to the circulation so as to improve the durability of the frictional material. One example of the technology is disclosed by Japanese Patent Laid-Open Publication No. 5-187541. In the technology, a valve through which the hydraulic oil flows from the third oil passage that communicates with the engagement side oil chamber to a drain oil passage is provided, and opening/closing of the valve is controlled. For example, a sensitive opening/closing valve called a bimetal orifice is provided. In the case where the temperature of the hydraulic oil increases, and becomes higher than a set temperature when the lock-up clutch is engaged with the front cover, the bimetal orifice is opened and part of the hydraulic oil in the engagement side oil chamber is drained. The hydraulic oil is circulated from the second oil passage so as to return to the second oil passage via the engagement side oil chamber, the third oil passage, and the drain passage. Thus, the lock-up clutch is cooled due to the circulation of the hydraulic oil so as to improve the durability of the frictional material. In addition to the aforementioned patent document, technologies concerning the lock-up clutch are disclosed in Japanese Patent Laid-Open Publication No. 8-14381, Japanese Patent Laid-Open Publication No. 8-4891, Japanese Patent Laid-Open Publication No. 7-180768, Japanese Patent Laid-Open Publication No. 4-4354, Japanese Patent Laid-Open Publication No. 10-89462, and the like.

However, in the case of the aforementioned bimetal orifice, only opening/closing thereof can be controlled, and a flow rate of the hydraulic oil when the orifice is opened cannot be controlled. The aforementioned hydraulic pressure difference may be changed depending on the flow rate. Thus, the control operation for the lock-up clutch, for example, the slip control operation may not be appropriately performed.

SUMMARY OF THE INVENTION

In view of the above, it is an object of the invention to provide a hydraulic pressure control apparatus for a vehicular hydraulic power transmission device with a lock-up clutch, in which a control operation for the lock-up clutch is appropriately performed in a vehicle including the lock-up clutch whose operating state is changed using a hydraulic pressure difference between an engagement side oil chamber and a disengagement side oil chamber.

In order to achieve the aforementioned object, an aspect of the invention relates to a hydraulic pressure control apparatus for a vehicular hydraulic power transmission device with a lock-up clutch whose operating state is changed using a hydraulic pressure difference between an engagement side oil chamber and a disengagement side oil chamber. The hydraulic pressure control apparatus includes a first oil passage that communicates with the disengagement side oil chamber; a second oil passage that communicates with the engagement side oil chamber; a third oil passage that communicates with the engagement side oil chamber; a high pressure oil passage that hydraulic oil is introduced; a low pressure oil passage that hydraulic oil whose pressure is lower than that in the high pressure oil passage is introduced; and a switching control valve which selectively connects each of the second oil passage and the third oil passage to the high pressure oil passage or the low pressure oil passage, according to an operating state of the lock-up clutch.

With this configuration, the switching control valve switches between connection and disconnection between each of the second oil passage and the third oil passage that communicate with the engagement side oil chamber, and each of the high pressure oil passage from which the high pressure hydraulic oil is introduced and the low pressure oil passage to which the low pressure hydraulic oil is discharged, according to the operating state of the lock-up clutch (i.e., a disengagement state, a slip state, and a complete engagement state). Therefore, the operating state of the lock-up clutch (i.e., the disengagement state, the slip state, and the complete engagement state) is appropriately controlled using the hydraulic pressure difference between the engagement side oil chamber and the disengagement side oil chamber. When the lock-up clutch is completely engaged, the switching control valve allows both the second oil passage and the third oil passage to be connected to the high pressure oil passage such that the hydraulic oil is supplied to both the second oil passage and the third oil passage that communicate with the engagement side oil chamber from the high pressure oil passage, and the hydraulic pressure in the engagement side oil chamber is increased. When the lock-up clutch is disengaged, the switching control valve allows both the second oil passage and the third oil passage to be connected to the low pressure oil passage such that the hydraulic oil is discharged to the low pressure oil passage from both the second oil passage and the third oil passage that communicate with the engagement side oil chamber, and the hydraulic pressure in the engagement side oil chamber is decreased. Thus, the operating state of the lock-up clutch is appropriately controlled. Particularly, when the lock-up clutch is completely engaged, a sufficient transmission torque capacity of the lock-up clutch is obtained. Further, when the lock-up clutch is in the slip state, the switching control valve allows one of the second oil passage and the third oil passage that communicate with the engagement side oil chamber to be connected to the high pressure oil passage, and allows the other oil passage to be connected to the low pressure passage such that the hydraulic oil is circulated. Therefore, an increase in the temperature of the hydraulic oil is suppressed, a slip surface of the lock-up clutch is cooled when the lock-up clutch is in the slip state, and thus the durability of the frictional material is improved.

Also, the switching control valve may allow the second oil passage and the third oil passage to be connected to the low pressure oil passage when the lock-up clutch is disengaged. With this configuration, the hydraulic pressure in the engagement side oil chamber can be promptly decreased, and therefore the control operation can be appropriately performed when the lock-up clutch is disengaged.

Also, the switching control valve may allow the second oil passage and the third oil passage to be connected to the high pressure oil passage when the lock-up clutch is completely engaged. With this configuration, the hydraulic oil does not flow from the engagement side oil chamber when the lock-up clutch is completely engaged, and cooling by circulation of the hydraulic oil is not necessary since heat is not generated by the slip. Therefore, a decrease in the hydraulic pressure in the engagement side oil chamber can be prevented, the control operation can be appropriately performed when the lock-up clutch is completely engaged, and a sufficient torque capacity of the lock-up clutch is obtained.

Further, the hydraulic pressure control apparatus may further include, as a circulation control device which controls a flow amount of the hydraulic oil flowing in the second oil passage and the third oil passage, a pressure adjusting valve which controls the hydraulic pressure in the low pressure oil passage, independently of the switching control valve.

With this configuration, the switching control valve switches between connection and disconnection between each of the second oil passage and the third oil passage that communicate with the engagement side oil chamber, and each of the high pressure oil passage from which the high pressure hydraulic oil is introduced and the low pressure oil passage to which the low pressure hydraulic oil is discharged, according to the operating state of the lock-up clutch. Therefore, the operating state of the lock-up clutch is appropriately controlled using the hydraulic pressure difference between the engagement side oil chamber and the disengagement side oil chamber. When the lock-up clutch is completely engaged, the switching control valve allows both the second oil passage and the third oil passage to be connected to the high pressure oil passage such that the hydraulic oil is supplied to both the second oil passage and the third oil passage that communicate with the engagement side oil chamber from the high pressure oil passage, and the hydraulic pressure in the engagement side oil chamber is increased. When the lock-up clutch is disengaged, the switching control valve allows both the second oil passage and the third oil passage to be connected to the low pressure oil passage such that the hydraulic oil is discharged to the low pressure oil passage from both the second oil passage and the third oil passage that communicate with the engagement side oil chamber, and the hydraulic pressure in the engagement side oil chamber is decreased. Thus, the operating state of the lock-up clutch is appropriately controlled. Particularly, when the lock-up clutch is completely engaged, a sufficient transmission torque capacity of the lock-up clutch is obtained. Further, when the lock-up clutch is in the slip state, the switching control valve allows one of the second oil passage and the third oil passage that communicate with the engagement side oil chamber to be connected to the high pressure oil passage, and allow the other oil passage to be connected to the low pressure passage such that the hydraulic oil is circulated. Therefore, an increase in the temperature of the hydraulic oil is suppressed, a slip surface of the lock-up clutch is cooled when the lock-up clutch is in the slip state, and thus the durability of the frictional material is improved. Further, the pressure adjusting valve controls the hydraulic pressure in the low pressure oil passage, independently of the switching control valve, and the circulation flow amount of the hydraulic oil in the engagement side oil chamber is appropriately set. Therefore, the lock-up clutch is cooled more appropriately, the durability of the frictional material is improved, and the slip control is performed more appropriately.

DETAILED DESCRIPTION OF THE PREFERRED EMBODIMENTS

Hereinafter, an embodiment of the invention will be described with reference to drawings.

Figure 1:
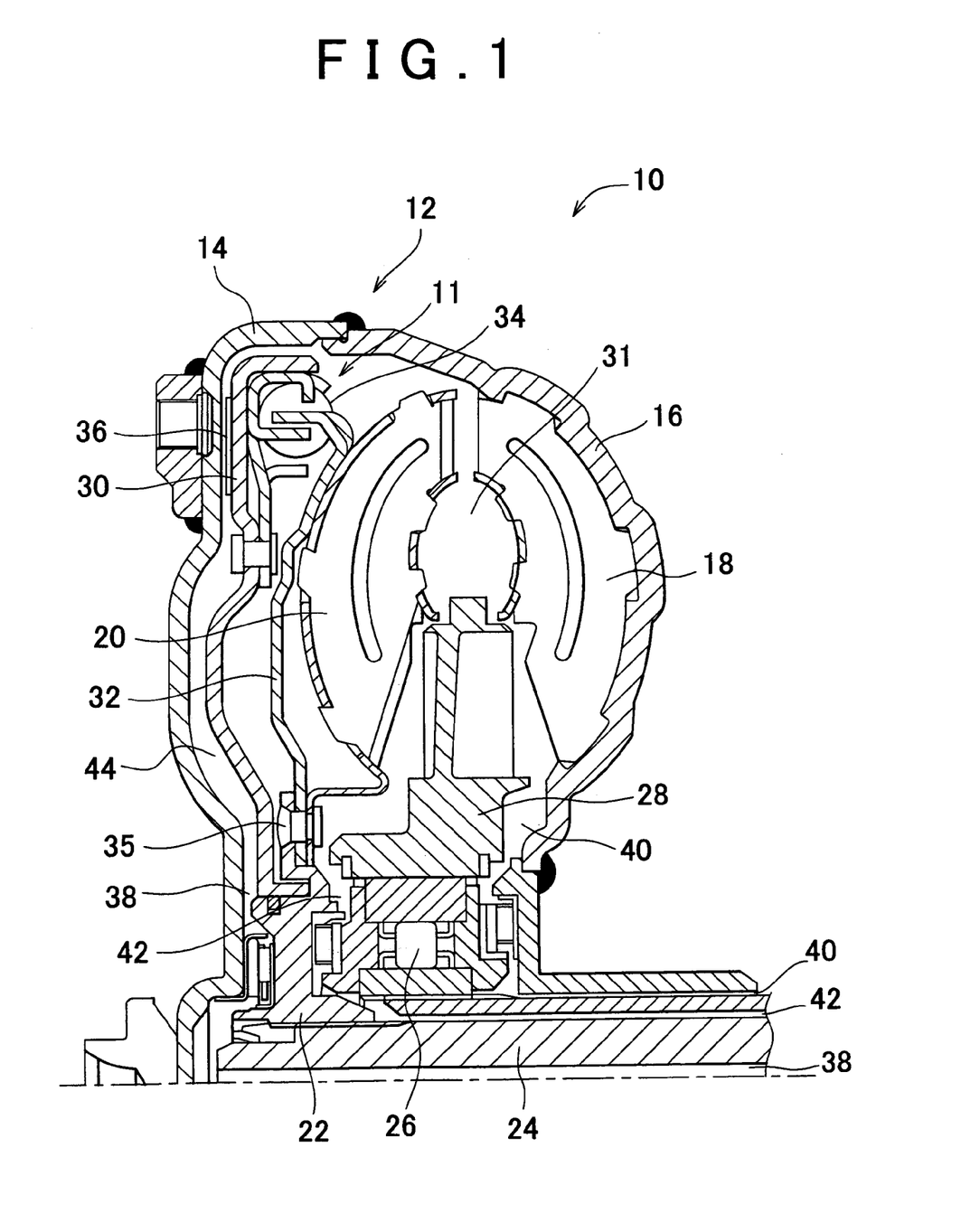
FIG. 1 is a diagram showing a torque converter including a lock-up clutch according to an embodiment of the invention.

FIG. 1 is a diagram showing a torque converter 10 including a lock-up clutch 11 which is a hydraulic transmission device according to an embodiment of the invention. The torque converter 10 includes a cover 12 which is an input side rotational member, and which is rotated integrally with a crank shaft of an engine (not shown). The cover 12 includes a front cover 14 that is a cover on the engine side (on the left side in FIG. 1), and a pump shell 16 that is a cover on a transmission side (on the right side in FIG. 1). The front cover 14 and the pump shell 16 are integrally coupled by welding. The front cover 14 and the pump shell 16 are configured so as to be oil-tight. The front cover 14 has a cylinder shape having a bottom, and is opened in one way. The outer peripheral portion of the pump shell 16 is coupled to the outer peripheral portion of the opening portion of the front cover 14.

The hydraulic oil is filled in the cover 12. A pump impeller 18 that is an input element of the torque converter 10 and a turbine runner 20 that is an output element of the torque converter 10 are disposed in the cover 12 so as to be opposed to each other. The pump impeller 18 and the cover 12 are integrally formed. The pump impeller 18 is coupled to the crank shaft (not shown). The turbine runner 20 is coupled to a driven shaft 24 through a turbine hub 22. When the pump impeller 18 is rotated, the hydraulic oil flows, and the flow of the hydraulic oil gives rotational torque to the turbine impeller 20, whereby the driven shaft 24 is rotated. The driven shaft 24 is equivalent to, for example, an input shaft of an automatic transmission (not shown). Engine output torque $T_E$ is transmitted to driving wheels (not shown) via the automatic transmission.

A stator impeller 28 is provided between the pump impeller 18 and the turbine runner 20 so as to be rotatable in one way via a one way clutch 26. The hydraulic oil discharged from the turbine runner 20 flows along the stator impeller 28, and returns to the pump impeller 18.

The lock-up clutch 11 includes a clutch piston 30, a damper 32, a coil spring 34, and the like. The clutch piston 30 is provided between the turbine runner 20 and the front cover 14 such that the clutch piston 30 can move close to and move away from the front cover 14. A space between the clutch piston 30 and the pump shell 16 is an engagement side oil chamber 31. This space is, for example, a space between the aforementioned input element and the output element of the torque converter 10. The damper 32 is provided between the clutch piston 30 and the turbine runner 20. The clutch piston 30 and the damper 32 are coupled at the outer peripheral edge thereof via the coil spring 34. The clutch piston 30 and the damper 32 are integrally rotated while they are permitted to be rotated with respect to each other in a predetermined range. Also, the damper 32 is fixed to the turbine runner 20 and the turbine hub 22 by a rivet 35 at the inner peripheral portion thereof. When the damper 32 is rotated, the turbine hub 22 and the driven shaft 24 coupled to the turbine hub 22 are rotated.

Frictional material 36 is attached to a surface of the clutch piston 30, the surface being opposed to the front cover 14. The frictional material 36 is made of material which has a relatively low coefficient of heat conductivity in order to increase durability or wear resistance. Examples of the material which has a relatively low coefficient of heat conductivity include material obtained by impregnating cellulose with resin.

A first oil passage 38 is formed between the front cover 14 and the turbine hub 22. The first oil passage 38 extends from a hole portion formed at the center of the driven shaft 24 to a space between the front cover 14 and the clutch piston 30, that is, a disengagement side oil chamber 44 which is a back pressure chamber, via a space between the front cover 14 and the turbine hub 22. Also, a second oil passage 40 is formed between the pump impeller 18 and the stator impeller 28. A third oil passage 42 is formed between the turbine hub 22 and the stator impeller 28. The second oil passage 40 and the third oil passage 42 communicate with the engagement side oil chamber 31. The second oil passage 40 and the third oil passage 42 communicate with each other via the engagement side oil chamber 31.

In the torque converter 10 thus configured, the lock-up clutch 11 is provided. The lock-up clutch 11 is a hydraulic friction clutch which is frictionally-engaged with the front cover 14 due to a hydraulic pressure difference $\Delta P$ that is a difference between the hydraulic pressure in the engagement side oil chamber 31 and the hydraulic pressure in the disengagement side oil chamber 44. When the lock-up clutch 11 is completely engaged, the pump impeller 20 and the turbine runner 24 are integrally rotated. A control of s slip state of the lock-up clutch is performed by controlling the hydraulic pressure difference $\Delta P$ through feedback. The hydraulic pressure difference $\Delta P$ corresponds engagement torque. When the vehicle is driven at a low speed and under low load, the turbine runner 24 is rotated in accordance with the rotation of the pump impeller 20 such that a slip amount becomes equal to a predetermined slip amount of approximately 50 rpm, for example. When the vehicle is not driven, for example, in case that a reverse input is transmitted from the driving wheel side to the engine 12 side when the vehicle is coasting (decelerating) forward with the throttle opening amount $\theta_{TH}$ being substantially zero, the pump impeller 20 is rotated in accordance with the rotation of the turbine runner 24 such that the slip amount becomes equal to a predetermined slip amount of approximately −50 rpm, for example. Hereinafter, the lock-up clutch control will be described in detail.

The electronic control unit 90 installed in the vehicle includes a so-called microcomputer. The microcomputer includes a CPU, RAM, ROM, an input/output interface, and the like. The CPU performs signal processing according to a program that is stored in the ROM in advance using a temporary storing function of the RAM, thereby performing output control for the engine 12, shifting control for the automatic transmission, lock-up clutch control for the lock-up clutch 11, and the like. The CPU for engine control and the CPU for hydraulic pressure control are separately configured, as necessary.

Figure 2:
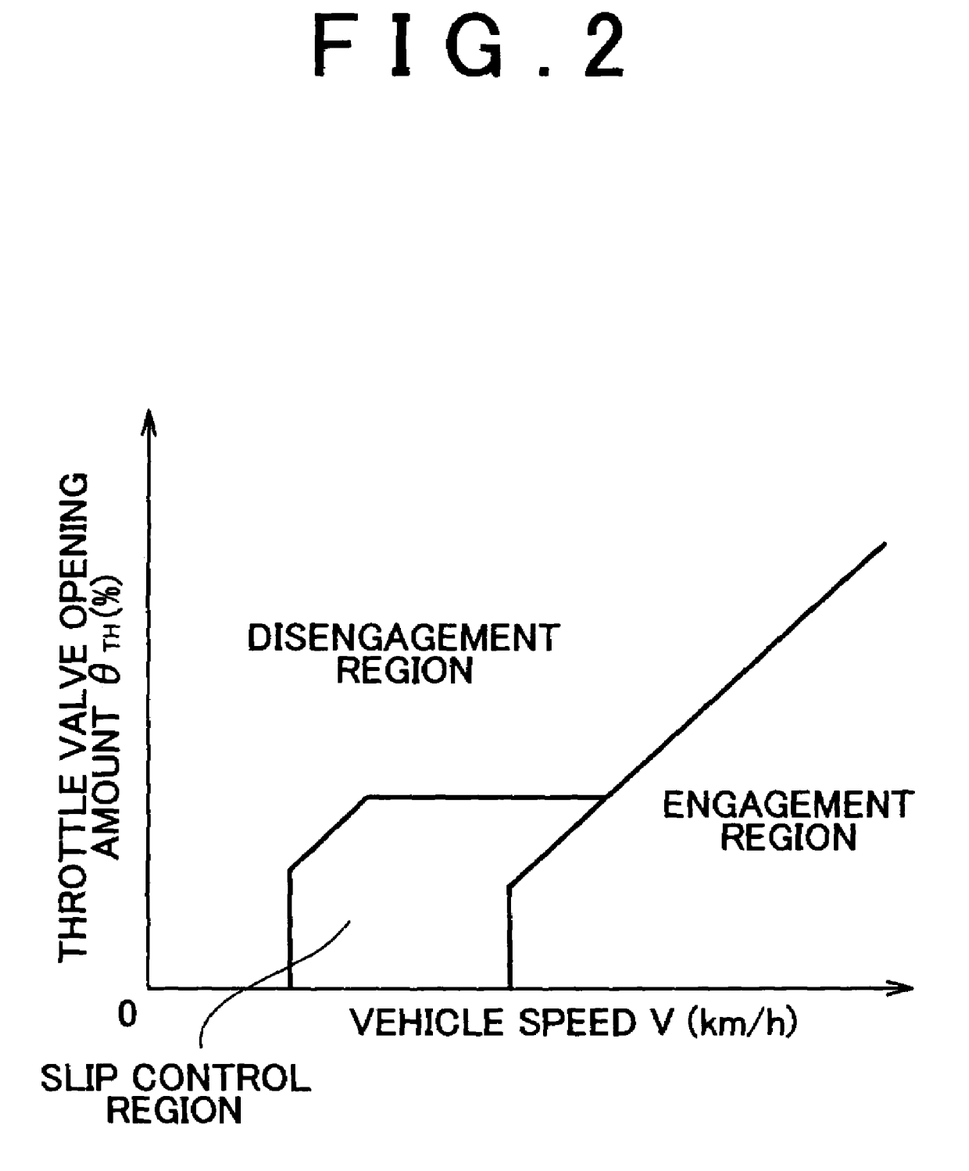
FIG. 2 is a lock-up region diagram, which is used for controlling the lock-up clutch in the torque converter in FIG. 1.

The electronic control unit 90 performs control, according to, for example, a map (relation) that is stored in advance as shown in FIG. 2. In the map, a disengagement region, a slip control region, and an engagement region are set in a two dimensional coordinate system, using the throttle valve opening amount $\theta_{TH}$ and the vehicle speed V as parameters. The electronic control unit 90 functionally includes a lock-up clutch control portion 100 (refer to FIG. 6) which controls an operating state of the lock-up clutch 11. The electronic control unit 90 controls a rotational speed difference $N_{SLP}$ (i.e. the slip amount) between the turbine rotational speed $N_T$ and the engine rotational speed $N_E$, which is obtained by subtracting the turbine rotational speed $N_T$ from the engine rotational speed $N_E$ (i.e., $N_E$–$N_T$), to a target rotational speed difference (a target slip amount) $N_{SLP}*$. The lock-up clutch control portion 100 performs control such that the lock-up clutch 11 is disengaged, is completely engaged, or is placed in the slip state. The lock-up clutch control portion 100 outputs a drive duty ratio $D_{SLU}$, which is a drive signal for the solenoid valve SLU for controlling the hydraulic pressure difference ΔP for the lock-up clutch 11, to a hydraulic pressure control apparatus 200. The hydraulic pressure control apparatus 200 is a hydraulic pressure apparatus portion concerning the control of the lock-up clutch 11.

When the lock-up clutch 11 is controlled to be completely engaged, a drive shaft coupled to a rotation shaft of the engine is directly coupled to an input shaft of an automatic transmission that is a driven shaft 24. When the lock-up clutch 11 is completely engaged, engine torque $T_E$, that is, input torque $T_{INTC}$ that is input to the torque converter 10 is transmitted to the automatic transmission with power transmission loss in the torque converter 10 being substantially zero. The capacity of the input torque $T_{INTC}$ is larger as engagement force of the lock-up clutch 11 is larger. The phrase "engagement force of the lock-up clutch 11 is larger" signifies that the hydraulic pressure in the engagement side oil chamber 31 is larger, and the hydraulic pressure difference ΔP is larger. Also, the aforementioned slip control is performed in order to improve fuel consumption as much as possible without deteriorating driveability. In the slip control, power transmission loss in the torque converter 10 is suppressed as much as possible while absorbing a change in the engine rotational speed of the engine 10. Thus, the lock-up clutch 11 is maintained in the slip state. For example, the slip control during deceleration is performed, for example, at the shift speed at which a reverse input is transmitted from the driving wheel side to the engine 12 side when the vehicle is coasting (decelerating) forward with the throttle opening amount $\theta_{TH}$ being substantially zero. During the slip control, the turbine rotational speed $N_T$ and the engine rotational speed $N_E$ are gradually decreased as the vehicle is decelerating while the rotational speed difference $N_{SLP}$ is made to be substantially equal to the target rotational speed difference $N_{SLP}*$, for example, –50 rpm. The slip control is performed by feedback control using the drive duty ratio $D_{SLU}$ for the solenoid valve SLU. When the lock-up clutch 11 is engaged in the slip state in this manner, the engine rotational speed $N_E$ is increased so as to be close to the turbine rotational speed $N_T$. Therefore, a fuel cut region (vehicle speed range) in which fuel supply to the engine 12 is stopped is enlarged, which improves fuel consumption.

For example, the durability of the frictional material 36 may deteriorate due to heat generation caused by slip between the front cover 14 and the lock-up clutch 11 while the lock-up clutch control portion 100 performs the slip control. The state of the hydraulic pressure control apparatus 200 is changed such that a supply state of the hydraulic oil that is supplied to the engagement side oil chamber is changed, in order to change the operating state of the lock-up clutch 11 and to improve the durability of the frictional material 36.

Figure 3:
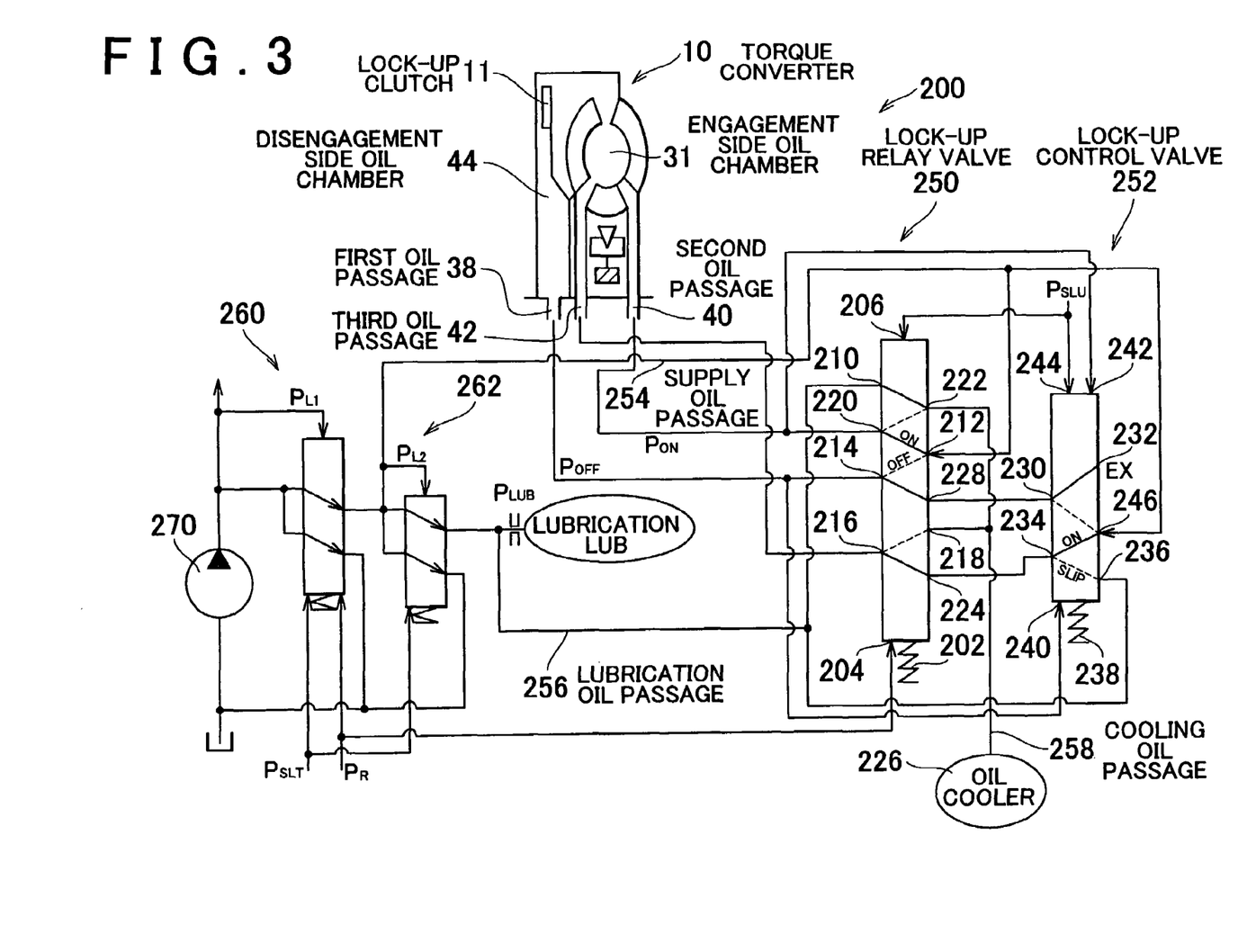
FIG. 3 is a diagram showing an example of a hydraulic pressure control apparatus for controlling the lock-up clutch.

FIG. 3 is a diagram showing an example of the hydraulic pressure control apparatus 200. The control pressure $P_{SLU}$ is supplied to a lock-up relay valve 250 and a lock-up control valve 252 for controlling the slip state. The linear solenoid valve SLU functions as a valve for generating control pressure. The control pressure $P_{SLU}$ is generated using modulator pressure $P_M$ as original pressure. The lock-up relay valve 250 and the lock-up control valve 252 change the operating state of the lock-up clutch 11. The linear solenoid valve SLT supplies the control pressure $P_{SLT}$ to a first pressure adjusting valve 260 and a second pressure adjusting valve 262 in order to control mainly line hydraulic pressure $P_{L1}$ and hydraulic pressure $P_{L2}$. A manual shift valve supplies reverse pressure $P_R$ to the lock-up relay valve 250 in order to perform control for changing the operating state of the lock-up clutch 11. Also, the manual shift valve supplies the reverse pressure $P_R$ to the first pressure adjusting valve 260 in order to control the hydraulic pressure $P_{L1}$. The reverse pressure is supplied using the line hydraulic pressure $P_{L1}$ as original pressure when the manual shift valve for changing a shift range of the automatic transmission is operated to an "R" range (range for reverse running). The line hydraulic pressure $P_{L1}$ is obtained by adjusting original pressure by the first pressure adjusting valve 260. The original pressure is generated by an oil pump 270 that is directly rotated by the engine. The line hydraulic pressure $P_{L1}$ is supplied mainly to a hydraulic pressure control apparatus for shifting (not shown) of the automatic transmission.

The line hydraulic pressure $P_{L2}$ is obtained by adjusting original pressure by the second pressure adjusting valve 262. The original pressure is the hydraulic pressure $P_{L1}$ discharged from the first pressure adjusting valve 260. The line hydraulic pressure $P_{L2}$ supplies the hydraulic oil for controlling the lock-up clutch 11 to the lock-up relay valve 250 and the lock-up control valve 252. Hereinafter, the line hydraulic pressure $P_{L2}$ will be referred to as second pressure $P_{L2}$.

The lock-up relay valve 250 includes a spool valve element $B_{250}$ (not shown), a spring 202, an oil chamber 204, and an oil chamber 206. The spring 202 gives thrust to the spool valve element $B_{250}$ such that the spool valve element $B_{250}$ moves to a disengagement (OFF) side position. The oil chamber 204 is provided in the vicinity of one axial end of the spool valve element $B_{250}$, and receives the reverse pressure $P_R$ for urging the spool valve element $B_{250}$ to the disengagement (OFF) side position. The oil chamber 206 is provided in the vicinity of the other axial end of the spool valve element $B_{250}$, and receives the control pressure $P_{SLU}$ for urging the spool valve element $B_{250}$ to an engagement (ON) side position.

When the spool valve element $B_{250}$ of the lock-up relay valve 250 is at the engagement side position, the lock-up control valve 252 controls the slip amount $N_{SLP}$ of the lock-up clutch 11, or causes the lock-up clutch 11 to be engaged, according to the control pressure $P_{SLU}$. The lock-up control valve 252 includes a spool valve element $B_{252}$ (not shown), a spring 238, an oil chamber 240, an oil chamber 242, and an oil chamber 244. The spring 238 gives thrust $F_{238}$ to the spool valve element $B_{252}$ such that the spool valve element $B_{252}$ moves toward the SLIP side position. The oil chamber 240 houses the spring 238, and receives the hydraulic pressure $P_{OFF}$ in the disengagement side oil chamber 44 of the torque converter 10 in order to urge the spool valve element $B_{252}$ toward the SLIP side position. The oil chamber 242 receives the hydraulic pressure ON in the engagement side oil chamber 31 of the torque converter 10 in order to urge the spool valve element $B_{252}$ toward the ON side position. The oil chamber 244 receives the control pressure $P_{SL}$.

The hydraulic pressure control apparatus 200 thus configured changes the supply state of the hydraulic oil that is supplied to the engagement side oil chamber 31 and the disengagement side oil chamber 44. Thus, the operating state of the lock-up clutch 11 is changed, and the circulation state of the hydraulic oil in the engagement side oil chamber 31 is changed. A high pressure passage for supplying the hydraulic oil to the engagement side oil chamber 31 and the disengagement side oil chamber 44 is a supply oil passage 254 for supplying the line hydraulic pressure $P_{L2}$. A low pressure oil passage for discharging the hydraulic oil from the engagement side oil chamber 31 and the disengagement side oil chamber 44 is a cooling oil passage 258, a lubrication oil passage 256, an oil passage EX, or the like. The hydraulic pressure in the low pressure oil passage is lower than that in the high pressure oil passage. The cooling oil passage 258 discharges the hydraulic oil to an oil cooler 226. The lubrication oil passage 256 supplies the lubrication oil in order to lubricate the automatic transmission and the like, using lubricating pressure $P_{LUB}$. The oil passage EX discharges the hydraulic oil at atmospheric pressure.

Hereinafter, control of the operating state of the lock-up clutch 11 will be described, focusing on each operating state. First, description will be made of a case where the lock-up clutch 11 is controlled to be disengaged. The spool valve element $B_{250}$ of the lock-up relay valve 250 is at the disengagement (OFF) side position, the second line pressure $P_{L2}$ supplied to an input port 212 is discharged from a disengagement side port 214, and is supplied to the disengagement side oil chamber 44 through the first oil passage 38 of the torque converter 10. At the same time, the hydraulic oil in the engagement side oil chamber 31 of the torque converter 10 is discharged to the oil cooler 226 through a second oil passage 40, an engagement side port 220, and a discharge port 222. At the same time, the hydraulic oil in the engagement side oil chamber 31 is discharged to the oil cooler 226 through the third oil passage 42, a control port 216, and a cooling port 218. This operation reduces the engagement pressure of the lock-up clutch 11, that is, the hydraulic pressure difference $\Delta P$ which is obtained by subtracting the hydraulic pressure $P_{OFF}$ in the disengagement side oil chamber 44 from the hydraulic pressure $P_{ON}$ in the engagement side oil chamber 31 (i.e., the hydraulic pressure $P_{ON}$ in the engagement side oil chamber 31—the hydraulic pressure $P_{OFF}$ in the disengagement side oil chamber 44). In other words, when the lock-up clutch 11 is disengaged, the lock-up relay valve 250 allows the second oil passage 40 and the third oil passage 42 that communicate with the engagement side oil chamber 31 to be connected to the cooling oil passage 258 that is the low pressure oil passage. Also, the lock-up relay valve 250 allows the first oil passage 38 that communicates with the disengagement side oil chamber 44 to be connected to the supply oil passage 254 that is the high pressure oil passage.

Next, description will be made of a case where the lock-up clutch 11 is controlled to be completely engaged. When the spool valve element B250 of the lock-up relay valve 250 is at the engagement (ON) side position, the second line pressure $P_{L2}$ supplied to the input port 212 is discharged from the engagement side port 220, and is supplied to the engagement side oil chamber 31 through the second oil passage 40 of the torque converter 10. When the spool valve element $B_{252}$ is at the ON side position at the same time, the second line pressure $P_{L2}$ supplied to the supply port 246 of the lock-up control valve 252 whose spool valve element $B_{252}$ is at the ON side position is supplied to the engagement side oil chamber 31 through the control port 234, a bypass port 224, the control port 216, and the third oil passage 42 of the torque converter 10. At the same time, the hydraulic oil in the disengagement side oil chamber 44 of the torque converter 10 is discharged from the discharge port 232 through the disengagement side port 214, the discharge port 228, and the control port 230 of the lock-up control valve 252. This operation increases the engagement pressure of the lock-up clutch 11. In other words, when the lock-up clutch 11 is completely engaged, the lock-up relay valve 250 and the lock-up control valve 252 allow the second oil passage 40 and the third oil passage 42 that communicate with the engagement side oil chamber 31 to be connected to the supply oil passage 254 that is the high pressure oil passage, and allow the first oil passage 38 that communicates with the disengagement side oil chamber 44 to be connected to the oil passage EX that is the low pressure oil passage. As a result, since the hydraulic oil does not flow from the engagement side oil chamber 31, the hydraulic pressure in the engagement side oil chamber 31 does not decreases, and a sufficient transmission torque capacity of the lock-up clutch 11 can be obtained.

Next, description will be made of a case where the lock-up clutch 11 is controlled to be placed in the slip state. When the spool valve element $B_{250}$ of the lock-up relay valve 250 is at the engagement (ON) side position, the second line pressure $P_{L2}$ supplied to the input port 212 is discharged from the engagement side port 220, and is supplied to the engagement side oil chamber 31 through the second oil passage 40 of the torque converter 10. At the same time, the hydraulic oil in the engagement side oil chamber 31 is discharged to the oil cooler 226 through the third oil passage 42, the control port 216, the bypass port 224, the control port 234 and the discharge port 236 of the lock-up control valve 252 whose spool valve element $B_{252}$ is at the SLIP side position. At the same time, the second line pressure $P_{L2}$ supplied to the supply port 246 of the lock-up control valve 252 is supplied to the disengagement side oil chamber 44 through the control port 230, the discharge port 228, the disengagement side port 214, and the first oil passage of the torque converter 10. This operation makes the hydraulic pressure difference $\Delta P$ smaller than the hydraulic pressure difference $\Delta P$ when the lock-up clutch 11 is completely engaged, the engagement pressure of the lock-up clutch 11 is decreased, and the lock-up clutch 11 is placed in the slip state. The lock-up control valve 252 controls the second line pressure $P_{L2}$ supplied to the disengagement side oil chamber 44 in order to obtain the hydraulic pressure difference $\Delta P$ for making the slip amount $N_{SLP}$ of the lock-up clutch 11 equal to the target slip amount $N_{SLP}*$. In other words, in the lock-up control valve 252, the hydraulic pressure $P_{ON}$ in the engagement side oil chamber 31 of the converter 10 and the hydraulic pressure $P_{OFF}$ in the disengagement side oil chamber 44 are changed according to the control pressure $P_{SLU}$. Accordingly, the engagement torque of the lock-up clutch 11 corresponding to the hydraulic pressure difference ΔP ($P_{ON}$–$P_{OFF}$) between the hydraulic pressure $P_{ON}$ and the hydraulic pressure $P_{OFF}$ are also changed according to the control pressure $P_{SLU}$. This operation controls the slip amount $N_{SLP}$. For example, in the lock-up control valve 252, the hydraulic pressure difference ΔP is changed according to the control pressure $P_{SLU}$, as shown in an equation ($P_{ON}$–$P_{OFF}$)×$S_{252}$+$P_{SLU}$×$S_{244}$=$F_{238}$, wherein $S_{252}$ indicates both a pressure-receiving area of the spool valve element $B_{252}$ on the oil chamber 240 side and a pressure-receiving area of the spool valve element on the oil chamber 242 side, and $S_{244}$ is a pressure-receiving area of the oil chamber 244. Thus, when the spool valve element $B_{250}$ of the lock-up relay valve 250 is at the ON side position, the lock-up clutch 11 is controlled to be engaged or to be placed in the slip state by the lock-up control valve 252 which operates according to the control pressure $P_{SLU}$.

That is, when the lock-up clutch 11 is in the slip state, the lock-up relay valve 250 and the lock-up control valve 252 allow the second oil passage 40 that communicates with the engagement side oil chamber 31 to be connected to the supply oil passage 254 that is the high pressure oil passage, and allow the third oil passage 42 that communicates with the engagement side oil chamber 31 to be connected to the lubrication passage 256 and the cooling oil passage 258 that are the low pressure oil passages. When the lock-up clutch 11 is in the slip state, the lock-up relay valve 250 and the lock-up control valve 252 allow the first oil passage 38 that communicates with the disengagement side oil chamber 44 to be connected to the supply oil passage 254 that is the high pressure oil passage. As a result, the lock-up clutch 11 is appropriately controlled to be placed in the slip state according to the hydraulic pressure difference ΔP. In addition, the temperature of the hydraulic oil is suppressed from increasing due to heat generated by the slip. The temperature of the hydraulic oil is suppressed from increasing since the hydraulic oil supplied into the engagement side oil chamber 31 through the second oil passage 40 is discharged through the third oil passage 42, that is, the hydraulic oil circulates in the engagement side oil chamber 31. Thus, the frictional material 36 is cooled and the durability of the frictional material 36 is improved. A circulation flow amount Q of the hydraulic oil at this time is decided mainly by circulation pressure difference ΔJ that is a difference between the second line pressure $P_{L2}$ and the lubricating pressure $P_{LUB}$ (i.e., $P_{L2}$–$P_{LUB}$). Since the circulation flow amount Q is thus controlled, and the hydraulic oil is not simply discharged at atmospheric pressure, the hydraulic pressure in the engagement side oil chamber 31 is not decreased even if the amount of the supplied hydraulic oil is decreased.

The lock-up relay valve 250 and the lock-up control valve 252 function as a switching control valve. The switching valve connects the second oil passage 40 that communicate with the engagement side oil chamber 31 to one of the high pressure oil passage or the low pressure oil passage, according to an operating state of the lock-up clutch. The switching valve also connects the third oil passage 42 that communicate with the engagement side oil chamber 31 to one the high pressure oil passage or the low pressure oil passage, according to an operating state of the lock-up clutch.

Figure 4:
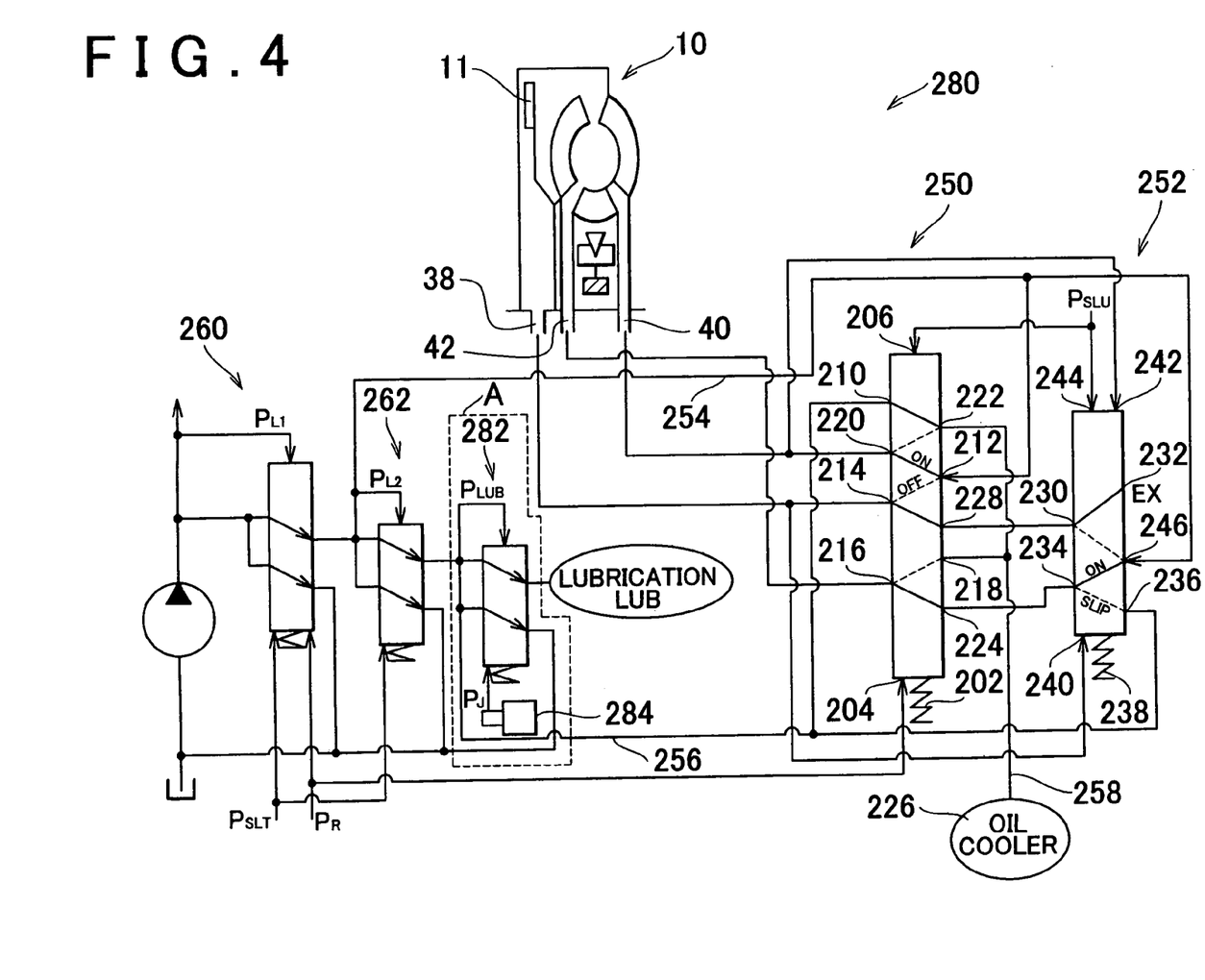
FIG. 4 is a diagram showing a hydraulic pressure control apparatus according to another embodiment of the invention, which is obtained by adding a dashed line portion A to the hydraulic pressure control apparatus in FIG. 3.

Next, another embodiment of the invention will be described. FIG. 4 is a diagram showing a hydraulic pressure control apparatus 280 according to another embodiment of the invention, which is obtained by adding a dashed line portion A to the hydraulic pressure control apparatus 200 in FIG. 3. In FIG. 4, the hydraulic pressure control apparatus 280 is the same as the hydraulic pressure control apparatus 200 except for the dashed line portion A. Therefore, description of the same portion will be omitted.

The dashed line portion A includes a lubricating pressure adjusting valve 282 and a solenoid valve 284 in order to control the lubricating pressure $P_{LUB}$. The dashed line portion A is a circulation flow amount control device which controls the circulation flow amount Q by controlling the lubricating pressure $P_{LUB}$. The circulation flow amount Q is decided by the circulation pressure difference ΔJ (i.e., $P_{L2}$–$P_{LUB}$). The lubricating pressure adjusting valve 282 is a relief valve. The lubricating pressure adjusting valve 282 adjusts the pressure of the surplus hydraulic oil discharged from the second pressure adjusting valve 262 according to lubrication control pressure $P_J$ output from the solenoid valve 284 such that a desired lubricating pressure $P_{LUB}$ is obtained in the lubrication passage 256. The solenoid valve 284 outputs the lubrication control pressure $P_J$ so as to obtain the desired lubricating pressure for obtaining the required circulation flow amount Q*, according to a command output from the electronic control unit 90. The dashed line portion A is provided as a pressure adjusting valve. The pressure adjusting valve can control the hydraulic pressure in the lubrication oil passage 256 as the low pressure oil passage, in addition to the lock-up relay valve 250 and the lock-up control valve 252 that function as the switching control valve for changing the operating state of the lock-up clutch 11 and the supply state of the hydraulic oil supplied to the engagement side oil chamber 31. Accordingly, the circulation flow amount Q that is decided by the circulation pressure difference ΔJ (i.e., $P_{L2}$–$P_{LUB}$) can be controlled, and the temperature of the hydraulic oil can be suppressed from increasing, irrespective of the control of the lock-up clutch 11. Thus, the durability of the frictional material 36 is improved. The lubrication control pressure $P_J$ output from the solenoid valve 284 may perform control such that the lubricating pressure $P_{LUB}$ is continuously changed. Alternatively, the lubrication control pressure $P_J$ may perform control such that the level of the lubricating pressure $P_{LUB}$ is switched between two levels, for example, a high level and a low level.

Figure 5:
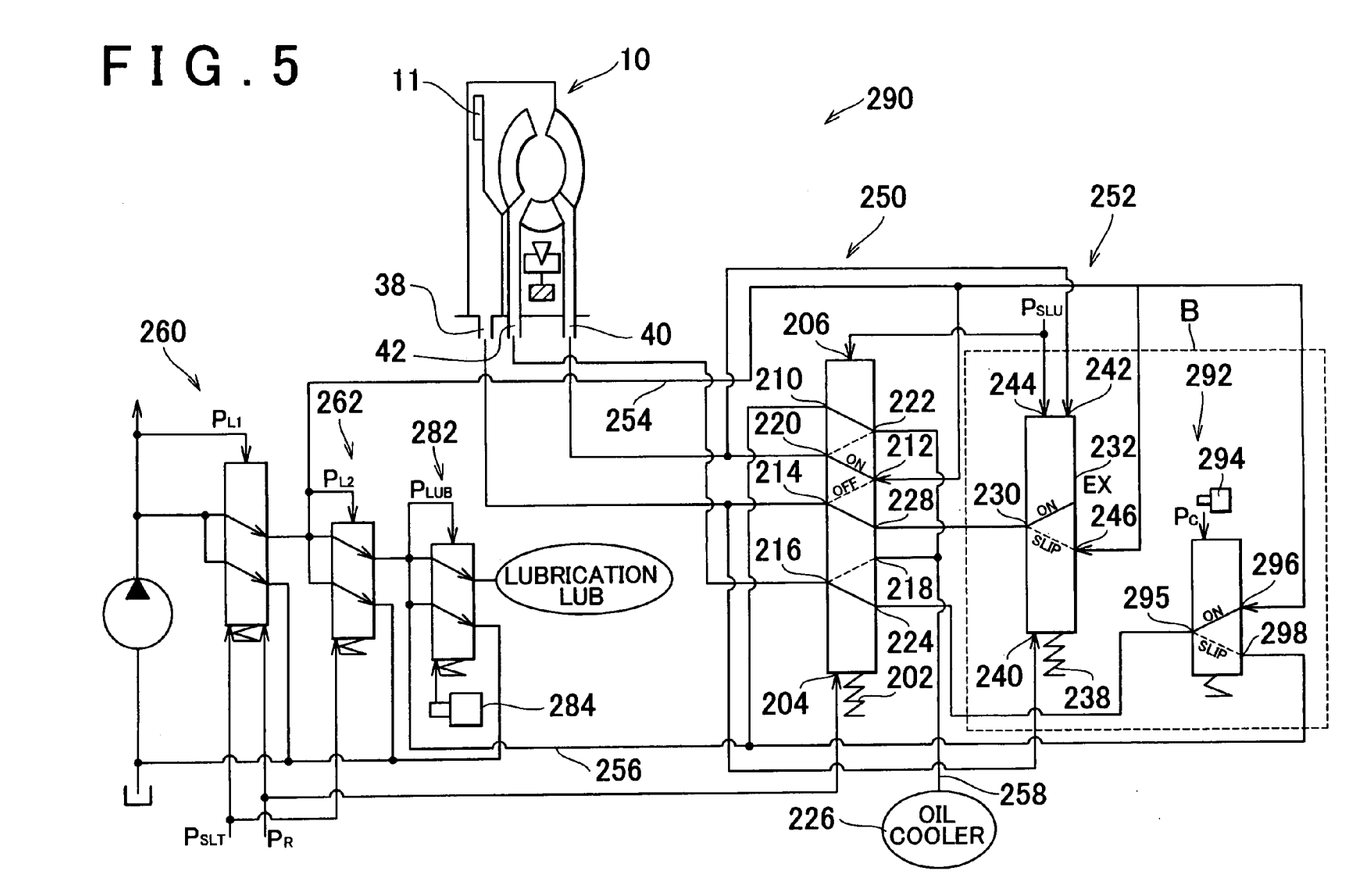
FIG. 5 is a diagram showing a hydraulic pressure control apparatus according to a further embodiment of the invention, which is obtained by adding a dashed line portion B to the hydraulic pressure control apparatus in FIG. 4.

A further embodiment of the invention will be described. FIG. 5 is a hydraulic pressure control apparatus 290 according to a further embodiment of the invention, which is obtained by adding a dashed line portion B to the hydraulic pressure control apparatus in FIG. 4. In FIG. 5, the hydraulic pressure control apparatus 290 is the same as the hydraulic pressure control apparatus 280 in FIG. 4 except for the dashed line portion B. Therefore, description of the same portion will be omitted.

In the dashed line portion B, a hydraulic pressure control apparatus for changing the supply state of the hydraulic oil supplied to the third oil passage is separated from the lock-up control valve 252. The dashed line portion B includes a switching valve 292 and a solenoid valve 294. The lock-up control valve 252 includes a first valve portion which allows the first oil passage to be connected to the high pressure oil passage, and a second valve portion which allows the third oil passage to be connected to one of the high pressure oil passage and the low pressure oil passage.

The control port 234, the discharge port 298, and the supply port 246 of the lock-up control valve 252 correspond to the control port 295, the discharge port 298, and the supply port 296 of the switching valve 292, respectively. The position of the switching valve 292 is switched between the ON position and the SLIP position, according to switching control pressure $P_C$. The solenoid valve 294 outputs the switching control pressure $P_C$ such that switching is performed between connection and disconnection between the oil passages in the same manner as in the case where the lock-up control valve 252 is used. Also, the solenoid valve 294 can output the switching control pressure $P_C$ so as to control the circulation flow amount Q that is the amount of hydraulic oil flowing from the control port 295 to the discharge port 298 during the slip control by the lock-up control valve 252 without being influenced by the slip control. As a result, irrespective of the control of the lock-up clutch 11, the circulation flow amount Q that is decided by the circulation pressure difference $\Delta J$ (i.e., $P_{L2}-P_{LUB}$) can be controlled more freely, an increase in the temperature of the hydraulic oil can be suppressed, and the durability of the frictional material 36 is improved.

Figure 6:
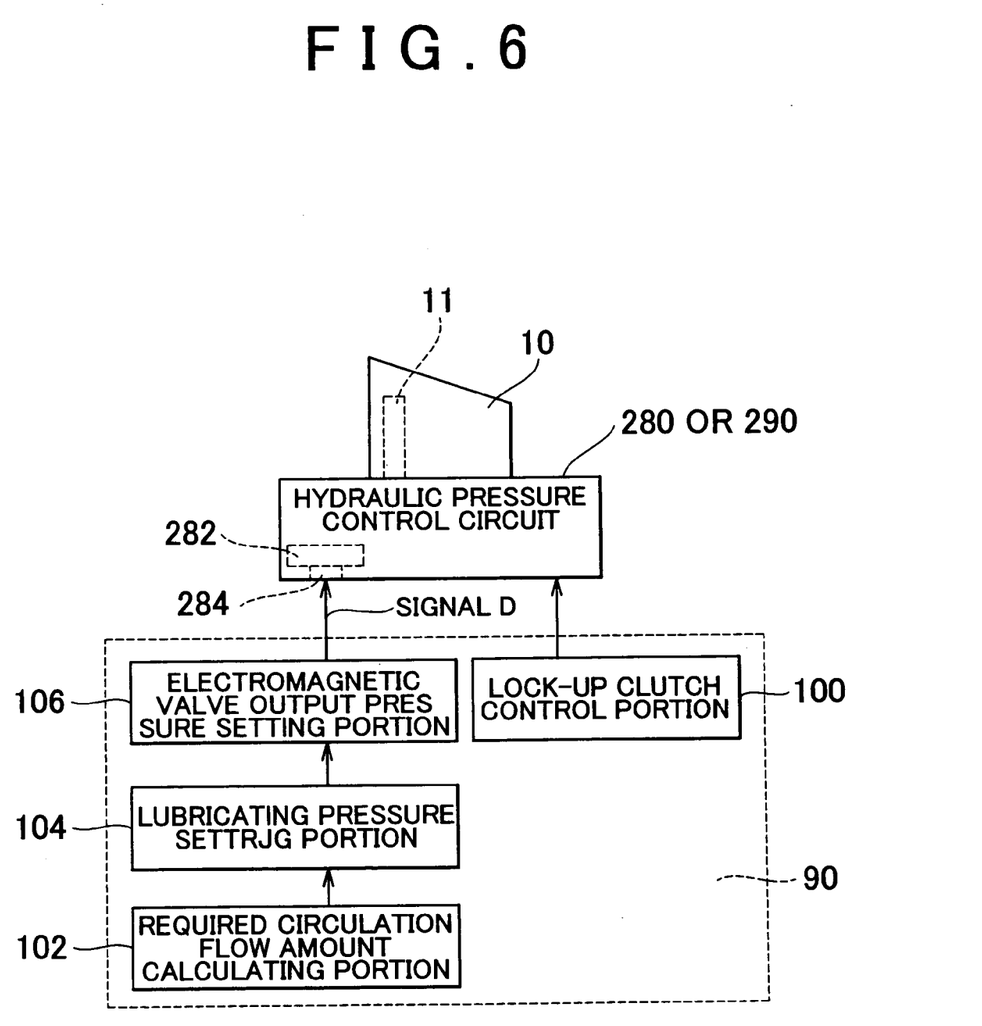
FIG. 6 is a function block diagram describing a main portion of a control portion of an electronic control unit, which controls the hydraulic pressure control apparatus.
Figure 7:
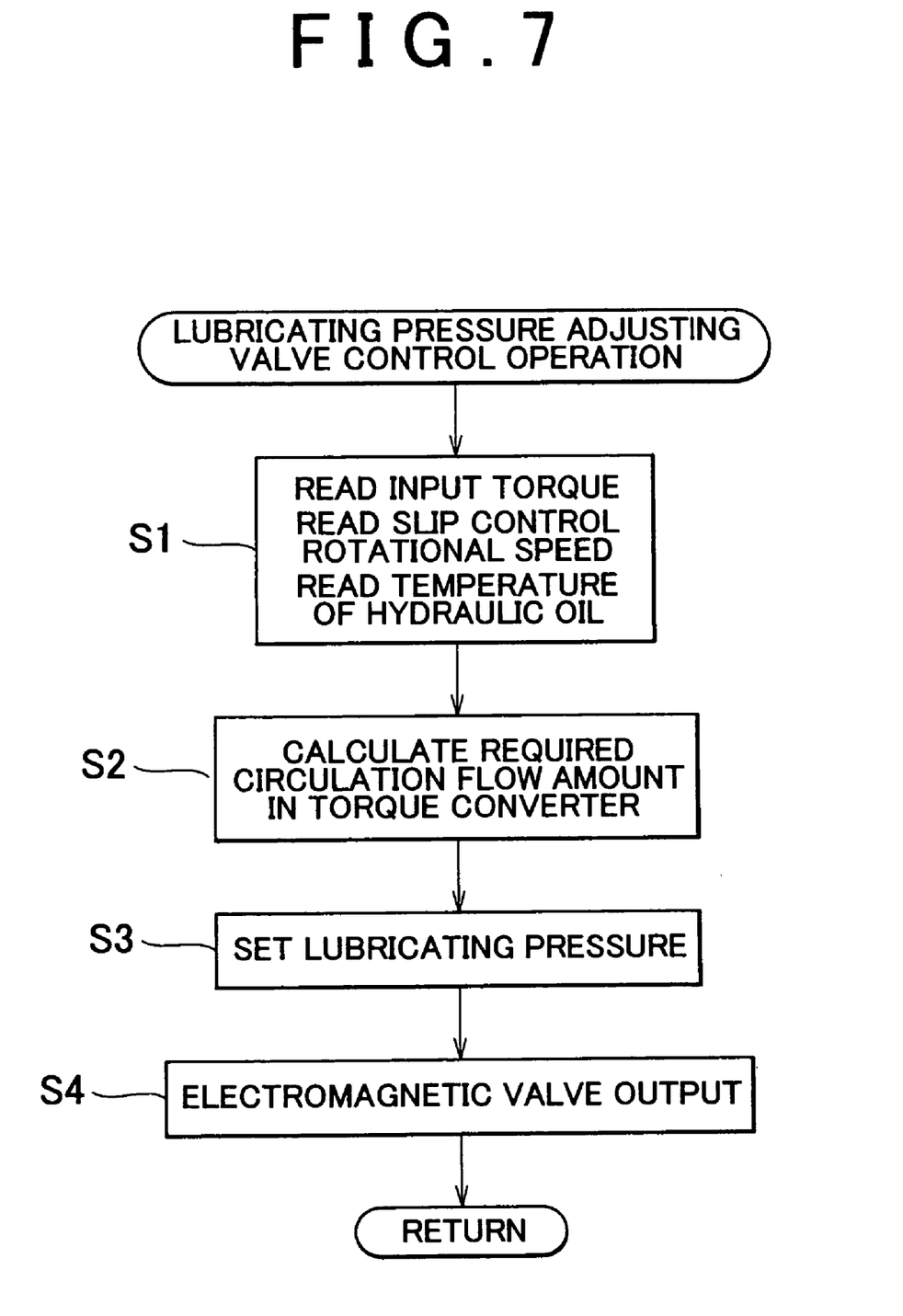
FIG. 7 is a flowchart describing an operation for controlling a lubricating pressure adjusting valve.

FIG. 6 is function block diagram describing a main portion of a control portion of the electronic control unit 90, which controls the hydraulic pressure control apparatus 280 or 290. FIG. 7 is a flowchart describing an operation for controlling the lubricating pressure adjusting valve 282. The lock-up clutch control portion 100 controls the operation of the lock-up clutch 11 by operating the hydraulic pressure control apparatus 200, 280, or 290.

A required circulation flow amount calculating portion 102, a lubricating pressure setting portion 104, and an electromagnetic valve output pressure setting portion 106 sets the lubricating control pressure $P_J$ output from the solenoid valve 284 in order to control the circulation flow amount Q using the hydraulic pressure control apparatus 280 or 290. Hereinafter, the setting method will be described with reference to the flowchart in FIG. 7.

Figure 8A:
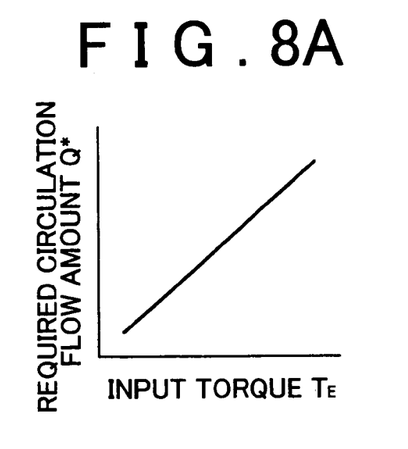
FIG. 8 is a relation (map) for calculating a required circulation flow amount based on input torque (engine output torque), a slip control rotational speed, a temperature of hydraulic oil, which is set in advance.
Figure 8B:
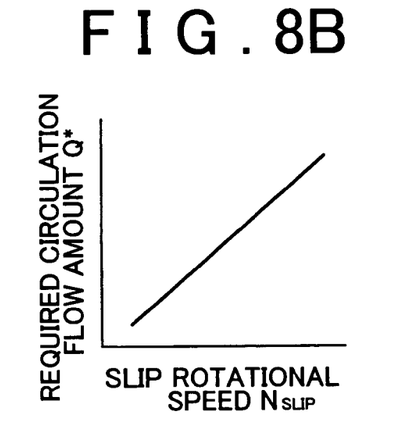
Figure 8C:
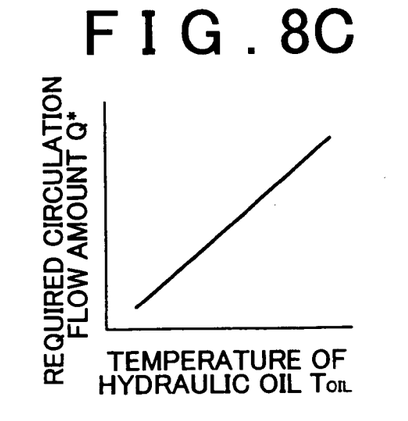
Figure 9:
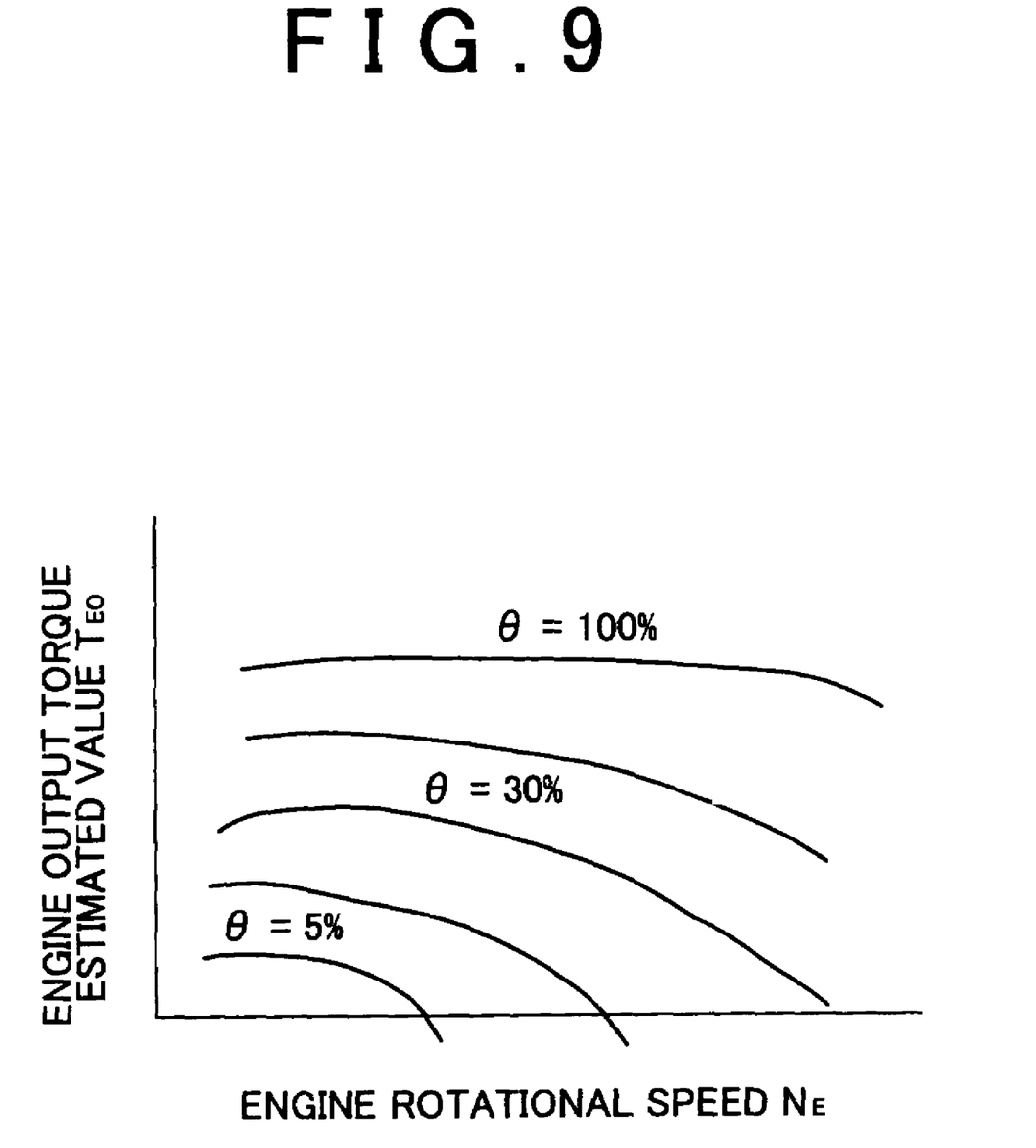
FIG. 9 is a relation (map) for calculating engine output torque as an engine output torque estimated value based on a throttle opening amount and an engine rotational speed, which is stored in advance.

The required circulation flow amount calculating portion 102 corresponds to step S1 to step S2 in the flowchart in FIG. 7. The required circulation flow amount calculating portion 102 reads torque input to the torque converter 10, that is, engine output torque $T_E$, the rotational speed difference $N_{SLP}$ in slip state, or the temperature of the hydraulic oil $T_{OIL}$, or the like so as to calculate the amount of heat generated by the slip control operation. The required circulation flow amount calculating portion 102 calculates a required circulation flow amount $Q^*$, for example, based on a relation between the amount of generated heat and the circulation flow amount Q required for decreasing the temperature of the hydraulic oil such that the temperature becomes lower than a predetermined temperature. The relation is set through experiments or the like. The required circulation flow amount $Q^*$ may be calculated using a relation (map) in FIG. 8, which is set in advance. FIG. 8 is a map corresponding to the amount of generated heat. As shown in FIG. 8, the required circulation flow amount $Q^*$ is proportional to each of the parameters that is proportional to the amount of generated heat, such as the input torque (engine output torque $T_E$), the rotational speed difference $N_{SLP}$, or the temperature of the hydraulic oil $T_{OIL}$. The required circulation flow amount $Q^*$ is set to be increased as the input torque (engine output torque $T_E$), the rotational speed difference $N_{SLP}$, or the temperature of the hydraulic oil $T_{OIL}$ is increased, that is, the amount of generated heat is increased. For example, the engine output torque $T_E$ is calculated as an engine output torque estimated value $T_{EO}$, based on the actual required load such as the throttle opening amount θ and the engine rotational speed $N_E$, according to the relation (map) shown in FIG. 9 that is stored in advance. For example, the predetermined temperature of the hydraulic oil is set such that predetermined durability of the frictional material 36 that is set in advance through experiments or the like can be sufficiently maintained under the predetermined temperature.

The lubricating pressure setting portion 104 corresponds to step S3. The lubricating pressure setting portion 104 sets the target lubricating pressure $P_{LUB}{}^*$ for obtaining the circulation pressure difference $\Delta J$ (i.e., $P_{L2}-P_{LUB}$) for obtaining the required circulation flow amount $Q^*$. The required circulation flow amount $Q^*$ is decided by the circulation pressure difference $\Delta J$. For example, in order to increase the required circulation flow amount $Q^*$, the circulation pressure difference $\Delta J$, that is, the target lubricating pressure $P_{LUB}{}^*$ is decreased.

The electromagnetic valve output pressure setting portion 106 corresponds to step S4. The electromagnetic output setting portion 106 outputs a signal D to the solenoid valve 284 such that the pressure output from the solenoid valve 284 becomes the lubrication control pressure PJ. The pressure output from the solenoid valve 284 is pressure for making the lubricating pressure $P_{LUB}$ adjusted by the lubricating pressure adjusting valve 282 equal to the target lubricating pressure $P_{LUB}{}^*$. As a result, the pressure in the lubrication oil passage 256 becomes equal to the target lubricating pressure PLUB*, the required circulation flow amount $Q^*$ can be obtained, and the temperature of the hydraulic oil can be decreased to be lower than the predetermined temperature. As a result, heat generation is suppressed during the slip operation, the frictional material 36 is cooled, and the durability of the frictional material 36 is improved. Also, since the required circulation flow amount $Q^*$ is set separately from the control of the lock-up clutch 11, the lock-up clutch can be appropriately controlled by the lock-up clutch control portion 100.

As described above, according to the embodiment of the invention, the switching control valve (the lock-up relay valve 250 and the lock-up control valve 252) switches between connection and disconnection between each of the two oil passages that communicate with the engagement side oil chamber 31 and each of the high pressure oil passage from which the high pressure hydraulic oil is introduced and the low pressure oil passage to which the low pressure hydraulic oil is discharged, according to an operating state of the lock-up clutch 11. Thus, the lock-up clutch 11, which is controlled using the hydraulic pressure difference $\Delta P$ that is a difference between the hydraulic pressure $P_{ON}$ in the engagement side oil chamber 31 and the hydraulic pressure POFF in the disengagement side oil chamber 44 (i.e., $P_{ON}-P_{OFF}$), can be appropriately operated. For example, when the lock-up clutch 11 is completely engaged, the switching control valve allows both the two oil passages that communicate with the engagement side oil chamber 31 to be connected to the high pressure oil passage such that the hydraulic oil is supplied to both the two oil passages from the high pressure oil passage, and the hydraulic pressure $P_{ON}$ in the engagement side oil chamber is increased. When the lock-up clutch 11 is disengaged, the switching control valve allows both the two oil passages that communicate with the engagement side oil chamber 31 to be connected to the low pressure oil passage such that the hydraulic oil is discharged to the low pressure oil passage from both the two oil passages, and the hydraulic pressure $P_{ON}$ in the engagement side oil chamber is decreased. Thus, the operating state of the lock-up clutch 11 is appropriately controlled. Particularly, when the lock-up clutch 11 is completely engaged, a sufficient transmission torque capacity of the lock-up clutch is obtained. Further, when the lock-up clutch 11 is in the slip state, the switching control valve allows one of the two oil passages that communicate with the engagement side oil chamber 31 to be connected to the high pressure oil passage, and allows the other oil passage to be connected to the low pressure passage such that the hydraulic oil is circulated. Therefore, an increase in the temperature of the hydraulic oil is suppressed, a slip surface of the lock-up clutch 11 is cooled when the lock-up clutch 11 is in the slip state, and thus the durability of the frictional material is improved.

Also, according to the embodiment of the invention, the two oil passages that communicate with the engagement side oil chamber 31 are the second oil passage 40 and the third oil passage 42. When the lock-up clutch 11 is in the slip state, the switching control valve allows one of the second oil passage 40 and the third oil passage 42 to be connected to the high pressure oil passage, for example the supply oil passage 254, and allows the other oil passage to be connected to the low pressure oil passage, for example, the lubrication oil passage 256 and the cooling oil passage 258. The hydraulic oil, which is supplied to the engagement side oil chamber 31 from the high pressure oil passage through one of the second oil passage 40 and the third oil passage 42, is discharged to the low pressure oil passage through the other oil passage. That is, the hydraulic oil supplied to the engagement side oil chamber 31 is circulated. As a result, an increase in the temperature of the hydraulic oil is suppressed, the slip surface of the lock-up clutch 11 is cooled, and the durability of the frictional material 36 is improved.

Also, according to the embodiment of the invention, when the lock-up clutch 11 is disengaged, the switching control valve allows the two oil passages, for example, the second oil passage 40 and the third oil passage 42 to be connected to the low temperature oil passage, for example, the lubrication oil passage 256 and the cooling oil passage 258. Since the hydraulic pressure $P_{ON}$ in the engagement side oil chamber 31 can be promptly decreased, the control operation can be appropriately performed when the lock-up clutch 11 is disengaged.

Also, according to the embodiment of the invention, when the lock-up clutch 11 is completely engaged, the switching control valve allows the two oil passages, for example, the second oil passage 40 and the third oil passage 42 to be connected to the high pressure oil passage, for example, the supply oil passage 254. The hydraulic oil does not flow from the engagement side oil chamber 31 when the lock-up clutch 11 is completely engaged, and cooling by the circulation of the hydraulic oil is not necessary since heat is not generated due to the slip operation. Thus, the hydraulic pressure $P_{ON}$ in the engagement side oil chamber 31 can be prevented from decreasing more appropriately, the control operation can be performed more appropriately when the lock-up clutch is completely engaged, and a sufficient torque capacity of the lock-up clutch 11 is obtained.

Also, according to the embodiment of the invention, the switching control valve (the lock-up relay valve 250 and the lock-up control valve 252) switches between connection and disconnection between each of the two oil passages that communicate with the engagement side oil chamber 31 and each of the high pressure oil passage from which the high pressure hydraulic oil is introduced and the low pressure oil passage to which the low pressure hydraulic oil is discharged, according to an operating state of the lock-up clutch 11. Thus, the lock-up clutch 11, which is controlled using the hydraulic pressure difference $\Delta P$ that is a difference between the hydraulic pressure $P_{ON}$ in the engagement side oil chamber 31 and the hydraulic pressure $P_{OFF}$ in the disengagement side oil chamber 44 (i.e., $P_{ON}-P_{OFF}$), can be appropriately operated. For example, when the lock-up clutch 11 is completely engaged, the switching control valve allows both the two oil passages that communicate with the engagement side oil chamber 31 to be connected to the high pressure oil passage such that the hydraulic oil is supplied to both the two oil passages from the high pressure oil passage, and the hydraulic pressure $P_{ON}$ in the engagement side oil chamber is increased. When the lock-up clutch 11 is disengaged, the switching control valve allows both the two oil passages that communicate with the engagement side oil chamber 31 to be connected to the low pressure oil passage such that the hydraulic oil is discharged to the low pressure oil passage from both the two oil passages, and the hydraulic pressure $P_{ON}$ in the engagement side oil chamber is decreased. Thus, the operating state of the lock-up clutch 11 is appropriately controlled. Particularly, when the lock-up clutch 11 is completely engaged, a sufficient transmission torque capacity of the lock-up clutch is obtained. Further, when the lock-up clutch 11 is in the slip state, the switching control valve allows one of the two oil passages that communicate with the engagement side oil chamber 31 to be connected to the high pressure oil passage, and allows the other oil passage to be connected to the low pressure passage such that the hydraulic oil is circulated. Therefore, an increase in the temperature of the hydraulic oil is suppressed, a slip surface of the lock-up clutch 11 is cooled when the lock-up clutch 11 is in the slip state, and thus the durability of the frictional material is improved. Further, the pressure adjusting valve (the lubricating pressure adjusting valve 282, the solenoid valve 284) controls the hydraulic pressure in the low pressure oil passage, independently of the switching control valve, and the circulation flow amount Q of the hydraulic oil in the engagement side oil chamber 31 is appropriately set. Thus, the lock-up clutch 11 is cooled more appropriately, the durability of the frictional material 36 is improved, and the slip control is performed more appropriately.

Also, according to the embodiment of the invention, there are provided a required circulation flow amount calculating portion 102 (steps S1, S2) that calculates the required circulation flow amount Q* when the lock-up clutch 11 is controlled to be placed in the slip state; a lubricating pressure setting portion 104 (S3) that sets the target lubricating pressure $P_{LUB}$*; and the electromagnetic valve output pressure setting portion 106 (S4) that controls the pressure adjusting valve (the lubricating pressure adjusting valve 282 and the solenoid valve 284) such that the lubricating pressure $P_{LUB}$ becomes equal to the target lubricating pressure $P_{LUB}$*. The required circulation flow amount Q* is calculated based on the parameter which is proportional to the amount of generated heat, in order to decrease the temperature of the hydraulic oil such that the temperature becomes lower than the predetermined temperature. Based on the required circulation flow amount Q*, the target lubricating pressure in the low pressure oil passage, for example, the lubrication oil passage 256 is set. The pressure adjusting valve (the lubricating pressure adjusting valve 282 and the solenoid valve 284) controls the target lubricating pressure PLUB* that is hydraulic pressure in the low pressure oil passage so as to obtain the required circulation flow amount Q* required for suppressing the amount of generated heat, which is calculated based on the torque input to the torque converter 10 (engine output torque $T_E$), the rotational speed difference $N_{SLP}$, the temperature of the hydraulic oil $T_{OIL}$, or the like. Since the hydraulic pressure in the low pressure oil passage is controlled, independently of the switching control valve (the lock-up relay valve 250 and the lock-up control valve 252), and the circulation flow amount Q of the hydraulic oil in the engagement side oil chamber 31 is appropriately set, the lock-up clutch 11 is cooled more appropriately, the durability of the frictional material 36 is improved, and the slip control is performed more appropriately.

The embodiment of the invention has been described with reference to the drawings. However, the invention is realized in other embodiments.

For example, in the aforementioned embodiments, as the hydraulic power transmission device, the torque converter 10 including the lock-up clutch 11 is employed. However, a fluid coupling which does not have the function of amplifying torque may be used.

Also, in the aforementioned embodiment, the solenoid valve 284 exclusively for outputting the lubrication control pressure $P_J$ in order to control the lubricating pressure adjusting valve 282 shown in FIG. 4 is used. However, any solenoid valve may be used as long as the solenoid valve can perform control such that the lubricating pressure $P_{LUB}$ is continuously changed, or the level of the lubricating pressure $P_{LUB}$ is switched between two levels, that is, the high level and the low level. A solenoid valve which is used in another hydraulic pressure control apparatus in a vehicle may be used.

Also, in the aforementioned embodiment, the solenoid valve 294 exclusively for controlling the switching valve 292 shown in FIG. 5 is used. However, the linear solenoid valve SLU which controls the lock-up relay valve 250 and the lock-up control valve 252 may control the switching valve 292.

Also, in the aforementioned embodiment, the two oil passages, that is, the second oil passage 40 and the third oil passage 42 are provided as the oil passages that communicate with the engagement side oil chamber 31. However, at least two oil passages that communicate with the engagement side oil chamber 31 may be provided. Therefore, at least one oil passage that is different from the second oil passage 40 and the third oil passage 42 may be provided, as the passage that communicates with the engagement side oil chamber 31.

Also, in the aforementioned embodiment, the hydraulic pressure control apparatus is configured such that the lubrication oil passage 256 is used as the low temperature oil passage for circulating the hydraulic oil in the engagement side oil chamber 31. However, the low pressure oil passage may be, for example, the cooling oil passage 258, the oil passage EX, or an oil passage to which a low pressure hydraulic oil having predetermined hydraulic pressure that is lower than that in the high pressure oil passage is discharged. Also, the high pressure oil passage is the supply oil passage 254 which supplies the line hydraulic pressure $P_{L2}$. However, an oil passage from which the line hydraulic pressure $P_{L1}$ that is original pressure of the line hydraulic pressure $P_{L2}$ is introduced, or the like may be used.

Also, in the aforementioned embodiment, when the lock-up clutch 11 is in the slip state, the oil passage for circulating the hydraulic oil in the engagement side oil chamber 31 is configured such that the hydraulic oil that is supplied into the engagement side oil chamber 31 through the second oil passage 40 is discharged through the third oil passage 42. However, the oil passage may be configured such that the hydraulic oil that is supplied into the engagement side oil chamber 31 through the third oil passage 42 is discharged through the second oil passage 40.

Also, in the aforementioned embodiment, the hydraulic pressure control apparatus 200, 280, or 290 is used as the hydraulic pressure control apparatus which switches between connection and disconnection between each of the second oil passage and the third oil passage, and each of the high pressure oil passage and the low pressure oil passage. However, the hydraulic pressure apparatus that connects the oil passages may be configured in various manners. In other words, the hydraulic pressure apparatus may be configured in any manner as long as the supply state of the hydraulic oil supplied to the engagement side oil chamber 31 is changed according to the operating state of the lock-up clutch 11.

The aforementioned embodiment is an exemplary embodiment. The invention can be realized in embodiments in which various changes and modifications are made based on knowledge of persons skilled in the art

What is claimed is:

1. A hydraulic pressure control apparatus for a vehicular hydraulic power transmission device with a lock-up clutch whose operating state is changed using a hydraulic pressure difference between an engagement side oil chamber and a disengagement side oil chamber, comprising:
   a first oil passage that communicates with the disengagement side oil chamber;
   a second oil passage that communicates with the engagement side oil chamber;
   a third oil passage that communicates with the engagement side oil chamber;
   a high pressure oil passage that hydraulic oil is introduced;
   a low pressure oil passage that hydraulic oil whose pressure is lower than that in the high pressure oil passage is introduced; and
   a switching control valve which selectively connects each of the second oil passage and the third oil passage to the high pressure oil passage or the low pressure oil passage, according to an operating state of the lock-up clutch,
   wherein the switching control valve allows one of the second oil passage and the third oil passage to be connected to the high pressure oil passage, and allows the other oil passage to be connected to the low pressure oil passage when the lock-up clutch is in a slip state,
   wherein the switching control valve allows the second oil passage and the third oil passage to be connected to the high pressure oil passage when the lock-up clutch is completely engaged.

2. The hydraulic pressure control apparatus according to claim 1, further comprising a discharge oil passage though which hydraulic oil is discharged, wherein the switching control valve allows the second oil passage and the third oil passage to be connected to the discharge oil passage when the lock-up clutch is disengaged.

3. The hydraulic pressure control apparatus according to claim 1, wherein the switching control valve includes a lock-up relay valve and a lock-up control valve.

4. The hydraulic pressure control apparatus according to claim 3, wherein the lock-up control valve allows the third oil passage to be connected to the low pressure oil passage when the lock-up clutch is in the slip state, and wherein the lock-up control valve allows the third oil passage to be connected to the high pressure oil passage when the lock-up clutch is completely engaged.

5. The hydraulic pressure control apparatus according to claim 4, wherein the lock-up control valve includes a first switching valve portion which allows the first oil passage to be connected to the high pressure oil passage, and a second switching valve portion which allows the third oil passage to be connected to one of the high pressure oil passage and the low pressure oil passage.

6. The hydraulic pressure control apparatus according to claim 1, further comprising a pressure adjusting valve which controls the hydraulic pressure in the low pressure oil passage.

7. The hydraulic pressure control apparatus according to claim 2, wherein the switching control valve includes a lock-up relay valve and a lock-up control valve.

8. The hydraulic pressure control apparatus according to claim 7, wherein the lock-up relay valve allows the second oil passage and the third oil passage to be connected to the discharge oil passage when the lock-up clutch is disengaged.

9. The hydraulic pressure control apparatus according to claim 8, wherein the lock-up relay valve includes a first switching valve portion which allows the first oil passage to be connected to the high pressure oil passage, a second switching valve portion which allows the second oil passage to be connected to one of the high pressure oil passage and the discharge oil passage and a third switching valve portion which allows the third oil passage to be connected to the discharge oil passage.

10. The hydraulic pressure control apparatus according to claim 8, wherein the lock-up control valve allows the third oil passage to be connected to the low pressure oil passage when the lock-up clutch is in the slip state, wherein the lock-up control valve allows the third oil passage to be connected to the high pressure oil passage when the lock-up clutch is completely engaged.

11. The hydraulic pressure control apparatus according to claim 10, wherein the lock-up control valve includes a first switching valve portion which allows the first oil passage to be connected to the high pressure oil passage, and a second switching valve portion which allows the third oil passage to be connected to one of the high pressure oil passage and the low pressure oil passage.

12. A hydraulic pressure control apparatus for a vehicular hydraulic power transmission device with a lock-up clutch whose operating state is changed using a hydraulic pressure difference between an engagement side oil chamber and a disengagement side oil chamber, comprising:
   a first oil passage that communicates with the disengagement side oil chamber;
   a second oil passage that communicates with the engagement side oil chamber;
   a third oil passage that communicates with the engagement side oil chamber;
   a high pressure oil passage through which hydraulic oil is introduced;
   a low pressure oil passage through which hydraulic oil whose pressure is pressure adjusted and is lower than that in the high pressure oil passage is introduced;
   a discharge oil passage through which hydraulic oil is discharged;
   a pressure adjusting valve which controls the hydraulic pressure in the low pressure oil passage; and
   a switching control valve which selectively connects each of the second oil passage and the third oil passage to the high pressure oil passage or the low pressure oil passage or the discharge oil passage, according to an operating state of the lock-up clutch.

13. The hydraulic pressure control apparatus according to claim 12, wherein the switching control valve includes a lock-up relay valve and a lock-up control valve.

14. The hydraulic pressure control apparatus according to claim 13, wherein the lock-up control valve allows the third oil passage to be connected to the low pressure oil passage when the lock-up clutch is in the slip state, wherein the lock-up control valve allows the third oil passage to be connected to the high pressure oil passage when the lock-up clutch is completely engaged.

15. The hydraulic pressure control apparatus according to claim 14, wherein the lock-up control valve includes a first switching valve portion which allows the first oil passage to be connected to the high pressure oil passage, and a second switching valve portion which allows the third oil passage to be connected to one of the high pressure oil passage and the low pressure oil passage.

16. The hydraulic pressure control apparatus according to claim 13, wherein the lock-up relay valve allows the second oil passage and the third oil passage to be connected to the discharge oil passage when the lock-up clutch is disengaged.

17. The hydraulic pressure control apparatus according to claim 16, wherein the lock-up relay valve includes a first switching valve portion which allows the first oil passage to be connected to the high pressure oil passage, a second switching valve portion which allows the second oil passage to be connected to one of the high pressure oil passage and the discharge oil passage and a third switching valve portion which allows the third oil passage to be connected to the discharge oil passage.

18. The hydraulic pressure control apparatus according to claim 16, wherein the lock-up control valve allows the third oil passage to be connected to the low pressure oil passage when the lock-up clutch is in the slip state, wherein the lock-up control valve allows the third oil passage to be connected to the high pressure oil passage when the lock-up clutch is completely engaged.

19. The hydraulic pressure control apparatus according to claim 18, wherein the lock-up control valve includes a first switching valve portion which allows the first oil passage to be connected to the high pressure oil passage, and a second switching valve portion which allows the third oil passage to be connected to one of the high pressure oil passage and the low pressure oil passage.

* * * * *